United States Patent
Sinha et al.

(10) Patent No.: US 11,176,724 B1
(45) Date of Patent: Nov. 16, 2021

(54) IDENTITY PRESERVING REALISTIC TALKING FACE GENERATION USING AUDIO SPEECH OF A USER

(71) Applicant: Tata Consultancy Services Limited, Mumbai (IN)

(72) Inventors: Sanjana Sinha, Kolkata (IN); Sandika Biswas, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/036,583

(22) Filed: Sep. 29, 2020

(30) Foreign Application Priority Data

May 21, 2020 (IN) .............................. 202021021475

(51) Int. Cl.
*G06T 13/20* (2011.01)
*G10L 15/02* (2006.01)
(Continued)

(52) U.S. Cl.
CPC ........ *G06T 13/205* (2013.01); *G06K 9/00281* (2013.01); *G06K 9/6215* (2013.01); *G06T 13/40* (2013.01); *G10L 15/02* (2013.01)

(58) Field of Classification Search
None
See application file for complete search history.

(56) References Cited

U.S. PATENT DOCUMENTS 6,735,566 B1 * 5/2004 Brand .................. G06K 9/6297
345/473
9,691,165 B2 * 6/2017 Bermano ................ G06T 13/40
(Continued)

FOREIGN PATENT DOCUMENTS

WO WO2003036469 A3 4/2014

OTHER PUBLICATIONS

Cudeiro, Daniel, et al. "Capture, learning, and synthesis of 3D speaking styles." (Year: 2019).*
(Continued)

*Primary Examiner* — Hilina K Demeter
(74) *Attorney, Agent, or Firm* — Finnegan, Henderson, Farabow, Garrett & Dunner, LLP

(57) ABSTRACT

Speech-driven facial animation is useful for a variety of applications such as telepresence, chatbots, etc. The necessary attributes of having a realistic face animation are: 1) audiovisual synchronization, (2) identity preservation of the target individual, (3) plausible mouth movements, and (4) presence of natural eye blinks. Existing methods mostly address audio-visual lip synchronization, and synthesis of natural facial gestures for overall video realism. However, existing approaches are not accurate. Present disclosure provides system and method that learn motion of facial landmarks as an intermediate step before generating texture. Person-independent facial landmarks are generated from audio for invariance to different voices, accents, etc. Eye blinks are imposed on facial landmarks and the person-independent landmarks are retargeted to person-specific landmarks to preserve identity related facial structure. Facial texture is then generated from person-specific facial landmarks that helps to preserve identity-related texture.

15 Claims, 15 Drawing Sheets

(51) Int. Cl.
*G06K 9/62* (2006.01)
*G06K 9/00* (2006.01)
*G06T 13/40* (2011.01)

(56) References Cited

U.S. PATENT DOCUMENTS

| | | | | |
|---|---|---|---|---|
| 2011/0115798 A1* | 5/2011 | Nayar | ............... | G06T 13/40 345/473 |
| 2017/0039750 A1* | 2/2017 | Tong | ............... | G06T 7/20 |
| 2017/0046065 A1* | 2/2017 | Zeng | ............... | G06F 3/012 |
| 2017/0069124 A1* | 3/2017 | Tong | ............... | G06F 16/5854 |
| 2020/0195463 A1* | 6/2020 | Johnson | ............... | H04L 12/2816 |
| 2021/0027511 A1* | 1/2021 | Shang | ............... | G06N 3/08 |

OTHER PUBLICATIONS

Cudeiro et al. "Capture, learning, and synthesis of 3D speaking styles" (Year: 2019).*

KR, Prajwal et al. "Towards Automatic Face-to-Face Translation" (Year: 2019).*

Pantic et al. "End-to-End Speech-Driven Realistic Facial Animation with Temporal GANs" (Year: 2019).*

Author: Amir Jamaludin, Joon Son Chung & Andrew Zisserman Title: You Said That?: Synthesising Talking Faces from Audio Title of the item: International Journal of Computer Vision Date: Feb. 2019 pp. 1767-1779 Publisher: Springer Link: https://www.researchgate.net/publication/331086769_You_Said_That_Synthesising_Talking_Faces_from_Audio/link/5c64fa53299bf1d14cc4d0b7/download.

Author: Kritaphat Songsri-in, Stefanos Zafeiriou Title: Face Video Generation from a Single Image and Landmarks Title of the item: Face Video Generation from a Single Image and Landmarks Date: Apr. 2019 Publisher: Arxiv Link: https://arxiv.org/pdf/1904.11521.pdf.

Author: Michal Dziemianko, Gregor Hofer, Hiroshi Shimodaira Title: HMM-based Automatic Eye-blink Synthesis from Speech Title of the item: Computer Science Date: Jan. 2009 Publisher: Semantic Scholar Link: https://www.researchgate.net/publication/221483110_HMM-based_automatic_eye-blink_synthesis_from_speech/link/54e36ef10cf2dbf60692a8cc/download.

Author: Bassel Zeno, Yu. N. Matveev Title: Identity Preserving Face Synthesis Using Generative Adversarial Networks Title of the item: International Conference on Engineering and MIS Date: Jun. 2019 pp. 1-6 Publisher: ACM Link: https://www.researchgate.net/publication/334151332_Identity_Preserving_Face_Synthesis_Using_Generative_Adversarial_Networks/link/5d1bce0d299bf1547c92b8df/download.

Author: Hao Tang, Dan Xu, Nicu Sebe, Yan Yan Title: Attention-Guided Generative Adversarial Networks for Unsupervised Image-to-Image Translation Title of the item: International Joint Conference on Neural Networks (IJCNN) Date: Jul. 2019 Publisher: IEEE Link: https://arxiv.org/pdf/1903.12296.pdf.

Author: Matteo Bodini Title: A Review of Facial Landmark Extraction in 2D Images and Videos Using Deep Learning Title of the item: Big Data and Cognitive Computing Date: 2019 Publisher: Semantic Scholar Link: https://www.researchgate.net/publication/331094835_A_Review_of_Facial_Landmark_Extraction_in_2D_Images_and_Videos_Using_Deep_Learning/link/5c65730392851c48a9d3c6d1/download.

* cited by examiner

IDENTITY PRESERVING REALISTIC TALKING FACE GENERATION USING AUDIO SPEECH OF A USER

PRIORITY CLAIM

This U.S. patent application claims priority under 35 U.S.C. § 119 to: India Application No. 202021021475, filed on May 21, 2020. The entire contents of the aforementioned application are incorporated herein by reference.

TECHNICAL FIELD

The disclosure herein generally relates to talking face generation techniques, and, more particularly, to identity preserving realistic talking face generation using audio speech of a user.

BACKGROUND

Generating a realistic talking face from speech input is a fundamental problem with several applications such as virtual reality, computer-generated imagery (CGI), chatbots, telepresence, etc. Essential requirements for all the applications are that the synthesized face must appear photo-realistic with accurate and realistic audio-visual lip synchronization and must also preserve the identity of the target individual. Also, for most of these applications, it is expected to have a single image with the target identity's face on which the motion has to be induced from a given speech input, for greater flexibility of changing the target subjects at test time. Hence, audio-driven realistic facial animation from a single image input is crucial. In general, any speech-driven facial animation method has several challenges due to the existence of a variety in the facial structures of different target identities, different voices, and accents in input audio, etc.

SUMMARY

Embodiments of the present disclosure present technological improvements as solutions to one or more of the above-mentioned technical problems recognized by the inventors in conventional systems. For example, in one aspect, there is provided a processor implemented method for identity preserving realistic talking face generation using audio speech of a user. The method comprises: obtaining, via one or more hardware processors, an audio speech and an identity image of a target individual; extracting, via the one or more hardware processors, one or more DeepSpeech features of the target individual from the audio speech; generating, using the extracted one or more DeepSpeech features, via a trained speech-to-landmark generation network executed by the one or more hardware processors, a speech-induced motion on a sparse representation of a neutral mean face pertaining to the at least one user, wherein the sparse representation of the speech-induced motion comprises a plurality of facial landmark points; generating, via a video dataset, a plurality of eye blink movements from random noise input, wherein the plurality of eye blink movements are generated for each eye based on a sequence of generated displacements of associated facial landmark points of each eye region, and wherein the plurality of eye blink movements comprise a set of eye landmark points with blink motion; replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion; generating one or more target-specific landmark points based on (i) the set of final landmark points and (ii) an identity landmark obtained from the identity image; and generating, an attention-based texture, using an attention map and a color map that are learnt using the one or more target-specific landmark points and the identity image, wherein the attention-based texture serves as an animated talking face of the target individual.

In an embodiment, the identity image comprises an image containing a neutral facial expression of the target individual.

In an embodiment, the step of generating, via a video dataset, a plurality of eye blink movements from random noise input, comprises: performing a comparison of the sequence of generated displacements of the associated facial landmark points of each eye region with one or more ground truth displacements, wherein one or more higher order moments of distribution of the sequence of generated displacements is compared with the one or more ground truth displacements; and generating the plurality of eye blink movements based on the comparison.

In an embodiment, wherein the one or more higher order moments of the sequence of generated displacements comprise one or more statistics of the distribution of the sequence of generated displacements of the associated facial landmark points of each eye region.

In an embodiment, the one or more statistics of the distribution of the sequence of generated displacements comprise at least one of a mean, a variance, and a skewness. In an embodiment, a Maximum Mean Discrepancy (MMD) loss is computed using the one or more statistics. In an embodiment, the MMD loss is a measure of a similarity or a dissimilarity between a distribution of (i) the plurality of eye blink movements and (ii) one or more ground truth eye blink movements.

In another aspect, there is provided a system for identity preserving realistic talking face generation using audio speech of a user. The system comprises a memory storing instructions; one or more communication interfaces; and one or more hardware processors coupled to the memory via the one or more communication interfaces, wherein the one or more hardware processors are configured by the instructions to: obtain an audio speech and an identity image of a target individual; extract one or more DeepSpeech features of the target individual from the audio speech; generate, using the extracted one or more DeepSpeech features, via a trained speech-to-landmark generation network executed by the one or more hardware processors, a speech-induced motion on a sparse representation of a neutral mean face pertaining to the at least one user, wherein the sparse representation of the speech-induced motion comprises a plurality of facial landmark points; generate, via a video dataset comprised in the memory, a plurality of eye blink movements from random noise input, wherein the plurality of eye blink movements are generated for each eye based on a sequence of generated displacements of associated facial landmark points of each eye region, and wherein the plurality of eye blink movements comprise a set of eye landmark points with blink motion; replace one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion; generate one or more target-specific landmark points based on (i) the set of final landmark points and (ii) an identity landmark obtained from the identity image; and generate, an attention-based texture, using an attention map and a color map that are learnt using the one or more target-specific landmark points and the identity image, wherein the attention-based texture serves as an animated talking face of the target individual.

In an embodiment, the identity image comprises an image containing a neutral facial expression of the target individual.

In an embodiment, the plurality of eye blink movements are generated from the random noise input by performing a comparison of the sequence of generated displacements of the associated facial landmark points of each eye region with one or more ground truth displacements, wherein one or more higher order moments of distribution of the sequence of generated displacements are compared with the one or more ground truth displacements; and generating the plurality of eye blink movements based on the comparison.

In an embodiment, the one or more higher order moments of the sequence of generated displacements comprise one or more statistics of the distribution of the sequence of generated displacements of the associated facial landmark points of each eye region.

In an embodiment, the one or more statistics of the distribution of the sequence of generated displacements comprise at least one of a mean, a variance, and a skewness. In an embodiment, a Maximum Mean Discrepancy (MMD) loss is computed using the one or more statistics. In an embodiment, the MMD loss is a measure of a similarity or a dissimilarity between a distribution of (i) the plurality of eye blink movements and (ii) one or more ground truth eye blink movements.

In yet another embodiment, there is provided a computer program product comprising a non-transitory computer readable medium having a computer readable program embodied therein, wherein the computer readable program, when executed on a computing device, causes the computing device to generate identity preserving realistic talking face using audio speech of a user by obtaining an audio speech and an identity image of a target individual; extracting, via the one or more hardware processors, one or more DeepSpeech features of the target individual from the audio speech; generating, using the extracted one or more DeepSpeech features, via a trained speech-to-landmark generation network, a speech-induced motion on a sparse representation of a neutral mean face pertaining to the at least one user, wherein the sparse representation of the speech-induced motion comprises a plurality of facial landmark points; generating, via a video dataset, a plurality of eye blink movements from random noise input, wherein the plurality of eye blink movements are generated for each eye based on a sequence of generated displacements of associated facial landmark points of each eye region, and wherein the plurality of eye blink movements comprise a set of eye landmark points with blink motion; replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion; generating one or more target-specific landmark points based on (i) the set of final landmark points and (ii) an identity landmark obtained from the identity image; and generating, an attention-based texture, using an attention map and a color map that are learnt using the one or more target-specific landmark points and the identity image, wherein the attention-based texture serves as an animated talking face of the target individual.

In an embodiment, the identity image comprises an image containing a neutral facial expression of the target individual.

In an embodiment, the step of generating, via a video dataset, a plurality of eye blink movements from random noise input, comprises: performing a comparison of the sequence of generated displacements of the associated facial landmark points of each eye region with one or more ground truth displacements, wherein one or more higher order moments of distribution of the sequence of generated displacements of the associated facial landmark points of each eye region are compared with the one or more ground truth displacements; and generating the plurality of eye blink movements based on the comparison.

In an embodiment, the one or more higher order moments of the sequence of generated displacements of the associated facial landmark points of each eye region comprise one or more statistics.

In an embodiment, the one or more statistics of the distribution of the sequence of generated displacements comprise at least one of a mean, a variance, and a skewness. In an embodiment, a Maximum Mean Discrepancy (MMD) loss is computed using the one or more statistics. In an embodiment, the MMD loss is a measure of a similarity or a dissimilarity between a distribution of (i) the plurality of eye blink movements and (ii) one or more ground truth eye blink movements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Generating a realistic talking face from speech input is a fundamental problem with several applications such as virtual reality, computer-generated imagery (CGI), chatbots, telepresence, etc. Essential requirements for all the applications are that the synthesized face must appear photorealistic with accurate and realistic audio-visual lip synchronization and must also preserve the identity of the target individual. Also, for most of these applications, it is expected to have a single image with the target identity's face on which the motion has to be induced from a given speech input, for greater flexibility of changing the target subjects at test time. Hence, audio-driven realistic facial animation from a single image input is crucial. In general, any speech-driven facial animation method has several challenges due to the existence of a variety in the facial structures of different target identities, different voices, and accents in input audio, etc.

Figure 1A:
FIG. 1A depicts a conventional two-dimensional (2D) facial animated image with a difference in image texture of synthesized face from a ground truth image texture that leads to perceived difference in identity of the rendered face from the target individual.
Figure 1B:
FIG. 1B depict a conventional two-dimensional (2D) facial animated image with implausible (or unrealistic) mouth shapes (last frame) that can be perceived as being fake.

In existing research works, most of the methods for facial video synthesis have focused on generating facial movements synchronized with speech, while only a few have addressed the generation of spontaneous facial gestures such as eye blinks that add realism to the synthesized video. However, these have either failed to preserve the perceived identity of the target individual (FIG. 1A—wherein output is produced by 'K. Vougioukas, S. Petridis, and M. Pantic. Realistic speech-driven facial animation with gans. arXiv preprint arXiv:1906.06337, 2019,' herein referred as 'Vougioukas et al.' and may be interchangeably used") or generate implausible shapes of the mouth in a talking face (FIG. 1B—wherein output is produced by "L. Chen, R. K. Maddox, Z. Duan, and C. Xu. Hierarchical cross-modal talking face generation with dynamic pixel-wise loss. In Proceedings of the IEEE Conference on Computer Vision and Pattern Recognition, pages 7832-7841, 2019.', herein referred as 'Chen et al.' and may be interchangeably used"). More specifically, FIG. 1A depicts a conventional two-dimensional (2D) facial animated image with a difference in image texture of synthesized face from a ground truth image texture that leads to perceived difference in identity of the rendered face from the target individual. FIG. 1B depict a conventional two-dimensional (2D) facial animated image with implausible mouth shapes (last frame) that can be perceived as being fake. In FIG. 1B, despite synchronization with audio, the facial animation sequence synthesized using the existing method of research work (e.g., Chen et al.' and may be interchangeably used) contains implausible mouth shapes (last frame) that can be perceived as being fake. The results were obtained by evaluation using pre-trained models made publicly available by the respective authors.

Lack of resemblance with given identity or change of identity in consecutive synthesized frames (FIG. 1A) can give rise to the uncanny valley effect as known in the art (refer 'M. Mori, K. F. MacDorman, and N. Kageki. The uncanny valley [from the field]. IEEE Robotics & Automation Magazine, 19(2):98-100, 2012.), in which the facial animation can be perceived as visually displeasing or eerie to the viewer. Moreover, the lack of any natural and spontaneous movements over the talking face except around the mouth region can be an indication of synthesized videos.

In the present disclosure, the above technical issues for generating realistic facial animation from speech are addressed. More specifically, the present disclosure describes speech-driven 2D facial animation which simultaneously addresses the following attributes required for realistic face animation: 1) audio-visual synchronization, (2) identity-preserving facial texture, (3) generation of plausible mouth movements, and (4) presence of natural eye blink movements. More specifically, system and method of the present disclosure generate a high-level representation of the face using 2D facial landmarks to capture the motion from speech, then an adversarial method is used for generating texture by learning motion-based image attention. The challenge is the decoupling of speech-driven motion from identity-related attributes such as different facial structures, face shapes, etc. for robust motion prediction. To address this, system and method of the present disclosure learn speech-related motion on identity-independent landmarks. Then, the learnt landmark motion is transferred to the person-specific landmarks for generating identity specific facial movements, instead of using a single-stage method as implemented in existing research work (e.g., refer Chen et al.) for landmark generation from speech. Unlike state-of-the-art methods for speech-driven 2D facial animation, system and method of the present disclosure implements DeepSpeech technique (e.g., refer DeepSpeech technique for details described by A. Hannun, C. Case, J. Casper, B. Catanzaro, G. Diamos, E. Elsen, R. Prenger, S. Satheesh, S. Sengupta, A. Coates, et al. Deep speech: Scaling up end-to-end speech recognition. arXiv preprint arXiv:1412.5567, 2014 . . . " herein after referred as Hannun et al. and may be interchangeably used) wherein the method of the present disclosure extracts Deep-Speech features of given audio input, which exhibits greater robustness to the variety in audio that exists due to different audio sources, accents, and noise. Since eye blinks are unrelated to speech, system and method of the present disclosure generate blink motion independently from audio-related landmark motion. Finally, an attention map and a color map are learnt from the identity image and the predicted person-specific landmarks. The attention map (e.g., refer "A. Pumarola, A. Agudo, A. M. Martinez, A. Sanfeliu, and F. Moreno-Noguer. Ganimation: Anatomically-aware facial animation from a single image. In Proceedings of the European Conference on Computer Vision (ECCV), pages 818-833, 2018." herein after referred as Pumarola et al. and may be interchangeably used) helps in segregating regions of facial motion (defined by the lower values of attention) from the rest of face containing identity-related information (defined by higher values of attention). The color map contains unique texture for the facial regions where the attention map indicates motion. System and method of the present disclosure use the combination of attention map and color map to generate the final texture. Texture in regions of motion is obtained from the color map, while the texture in the rest of the face is obtained from the input identity image (driven by the weights of the attention map). Network comprised in the system of the present disclosure learns the attention map and the color map without explicit attention or color map labels for supervision.

Figure 2:
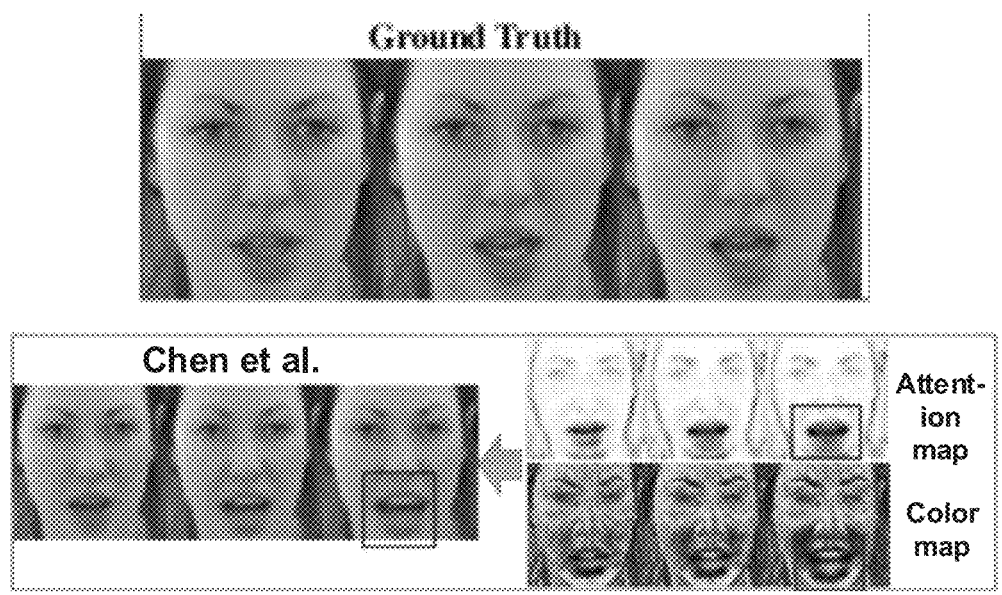
FIG. 2 depicts effect of intermediate attention and color map on a final texture as generated by a conventional method.

The quality of the learned attention map is extremely crucial for the overall quality of the generated face. FIG. 2 shows an example of synthesized face images by Chen et al. where the final texture of the animated face is adversely affected by the values of intermediate attention map and color map. More specifically, FIG. 2 depicts effect of intermediate attention and color map on a final texture as generated by a conventional method. The actual attention map (where higher values indicate regions with more significant motion) generated by Chen et al. is inverted here for direct comparison with our attention map (lower values indicate regions with more significant motion) Intermediate attention values (gray areas) of extended regions surrounding the lips in the attention map generated by Chen et al. (e.g., refer last row) results in the blurred texture and unusual shape of the mouth in the animated face (last frame). In regions of facial motion surrounding the mouth, uniform regions of very low values (dark regions) of the attention map are needed for sharp texture generation, while intermediate values (gray regions) lead to blur in mouth texture (shown in FIG. 2 last row). In regions of low attention (dark regions of the attention map indicating motion), the color map values contribute to the overall sharpness of the generated texture and shape of the mouth. To address the problem of accurate attention and color map generation, the present disclosure provides system and methods that implement an architecture for texture generation which uses LSGAN (e.g., refer "X. Mao, Q. Li, H. Xie, R. Y. Lau, Z. Wang, and S. Paul Smolley. Least squares generative adversarial networks. In Proceedings of the IEEE International Conference on Computer Vision, pages 2794-2802, 2017." herein after referred as Mao and may be interchangeably used) for learning sharp image texture and plausible mouth shapes. Moreover, during adversarial training, if attention values become very low in static facial regions, it can lead to texture blur and possible loss of identity information. Hence, regularization is also needed as an additional constraint in the learning of the attention map. Unlike Chen et al., the system and method of the present disclosure implement and utilize spatial and temporal $L_2$ regularization on the attention and color map for generating smooth motion and plausible mouth shapes without loss of identity.

In the art, generating realistic talking faces from audio has been a research problem in the computer vision and graphics community for decades. Research works have carried out the speech-driven synthesis of lip movements (e.g., refer "L. Chen, Z. Li, R. K Maddox, Z. Duan, and C. Xu. Lip movements generation at a glance. In Proceedings of the European Conference on Computer Vision (ECCV), pages 520-535, 2018."), as well as animation of the entire face in 2D. Earlier approaches have carried out subject-specific talking face synthesis from speech. However, these approaches require a large amount of training data of the target subject, and such subject-specific models cannot generalize to a new person. Subject-independent facial animation was carried out by Chung et al. (e.g., refer "J. S. Chung, A. Jamaludin, and A. Zisserman. You said that? arXivpreprint arXiv:1705.02966, 2017.") from speech audio and a few still images of the target face. However, the generated images contain blur due to $L_1$ loss minimization on pixel values and an additional de-blurring step was required. On the other hand, Generative Adversarial Networks (GANs) (e.g., refer "I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pages 2672-2680, 2014.", herein referred as 'Goodfellow et al.' and may be interchangeably used) were widely used for image generation due to their ability to generate sharper, more detailed images compared to networks trained with only $L_1$ loss minimization. Other GAN-based methods have generated facial animation from arbitrary input audio and a single image of target identity. In the present disclosure, system and method implement a GAN based approach for synthesizing face images from the motion of intermediate facial landmarks, which are generated from audio.

Further, existing methods have mostly addressed audio synchronization instead of focusing on overall realism of the rendered face video. The absence of spontaneous movements such as eye blinks can also be an indication of synthesized videos (e.g., refer "Y. Li, M.-C. Chang, and S. Lyu. In ictu oculi: Exposing ai generated fake face videos by detecting eye blinking. arXiv preprint arXiv:1806.02877, 2018.") Few research works have addressed this problem by using adversarial learning of spontaneous facial gestures such as blinks (e.g., refer Vougioukas et al.). However, these methods generate facial texture without the use of landmark-guided image attention, which can lead to loss of facial identity (FIGS. 1A-1B). In the present disclosure, system and method perform eye blink generation for realism of synthesized face videos. Unlike Vougioukas et al., the system and method of the present disclosure generates blink motion on facial landmarks to ensure decoupled learning of motion and texture for better identity preservation.

Moreover, in talking face synthesis, subject-related and speech-related information are separately addressed in existing research work (e.g., refer "H. Zhou, Y. Liu, Z. Liu, P. Luo, and X. Wang. Talking face generation by adversarially disentangled audio-visual representation. In Proceedings of the AAAI Conference on Artificial Intelligence, volume 33, pages 9299-9306, 2019.", herein referred as Zhou et al. and may be interchangeably used) by learning disentangled audiovisual information, i.e., complementary representations for speech and identity, thereby generating talking face from either video or speech. Using high-level image representations such as facial landmarks (e.g., refer "V. Kazemi and J. Sullivan. One millisecond face alignment with an ensemble of regression trees. In Proceedings of the IEEE conference on computer vision and pattern recognition, pages 1867-1874, 2014.", herein referred as Kazemi et al. and may be interchangeably used) is another way to segregate speech related motion from texture elements such as identity information, viewing angle, head pose, background, illumination. Existing research work as described by Chen et al. adopted a two-stage approach in which facial motion is decoupled from texture using facial landmarks. Although the system and method of the present disclosure uses facial landmarks to segregate motion from texture, unlike Chen et al., the method of the present disclosure involves imposing natural facial movements like eye blinks in addition to lip synchronization with given audio input. Person-independent landmarks are retargeted with audio-related motion and blinks to person-specific landmarks for subsequent texture generation. This helps in generating plausible mouth shapes in the target facial structures.

Referring now to the drawings, and more particularly to FIGS. 3 through 14, where similar reference characters denote corresponding features consistently throughout the figures, there are shown preferred embodiments and these embodiments are described in the context of the following exemplary system and/or method.

Figure 3:
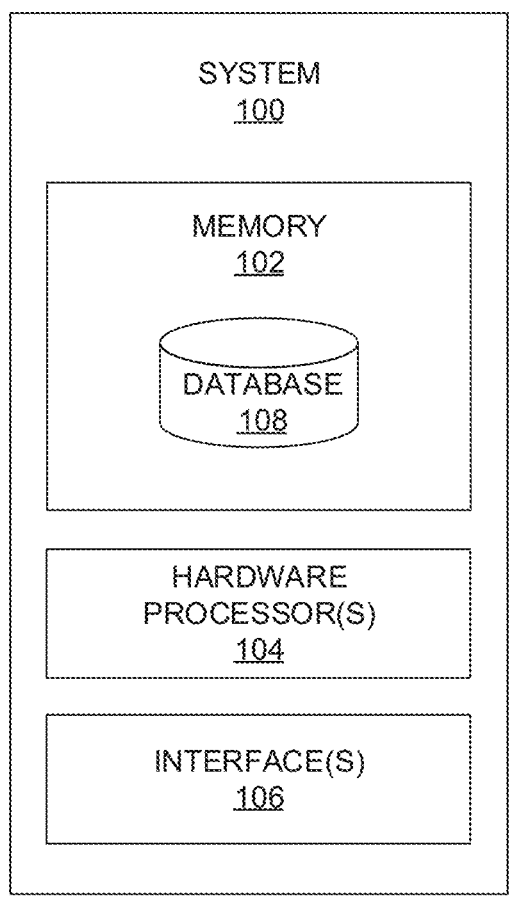
FIG. 3 depicts a system for identity preserving realistic talking face generation using audio speech of a target individual, in accordance with an embodiment of the present disclosure.

FIG. 3 depicts a system 100 for identity preserving realistic talking face generation using audio speech of a target individual, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises image datasets, video datasets, audio speech of one or more users (e.g., target individuals).

The information stored in the database 108 may further comprise (i) DeepSpeech features of the target individual being extracted from the audio speech of a user, wherein the DeepSpeech features are extracted using a DeepSpeech features technique (or DeepSpeech features extraction technique and may be interchangeably used herein) comprised in the memory 102. The information stored in the database 108 (or memory 102) may further comprise a speech-to-landmark generation network that is trained for generating speech-induced motion on a sparse representation of a neutral mean face pertaining to the user, wherein the sparse representation of the speech-induced motion comprises a plurality of facial landmark points. The database 108 further comprises a plurality of eye blink movements generated from random noise input using one or more video datasets. Further, the database 108 comprises one or more target-specific landmark points generated for each user. The database 108 further comprises an attention map and a color map generated for each user. The database 108 further comprises attention-based texture (e.g., talking face) generated for each target individual.

In an embodiment, one or more techniques, neural networks, and the like, as known in the art are comprised in the memory 102 and invoked as per the requirement to perform the methodologies described herein. For instance, the system 100 stores a DeepSpeech features technique, a speech-to-landmark generation network, OpenFace, face segmentation technique, a blink generation network, an Attention-based Texture Generator in the memory 102 that are invoked for execution of the method of the present disclosure. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 4:
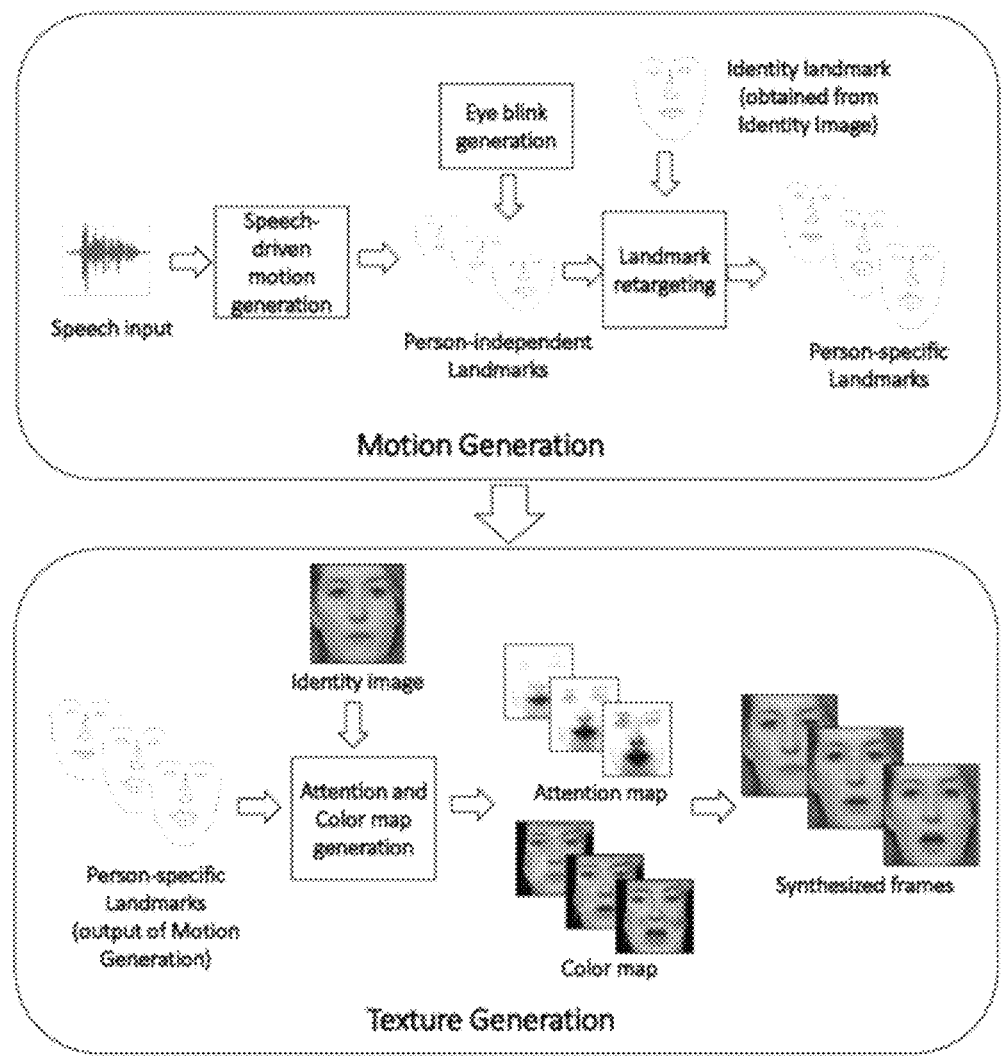
FIG. 4 depicts a block diagram of an architecture as implemented by the system of FIG. 3 for identity preserving realistic talking face generation using audio speech of the target individual, in accordance with an embodiment of the present disclosure.

FIG. 4, with reference to FIG. 3, depicts a block diagram of an architecture as implemented by the system 100 of FIG. 3 for identity preserving realistic talking face generation using audio speech of the target individual, in accordance with an embodiment of the present disclosure.

Figure 5:
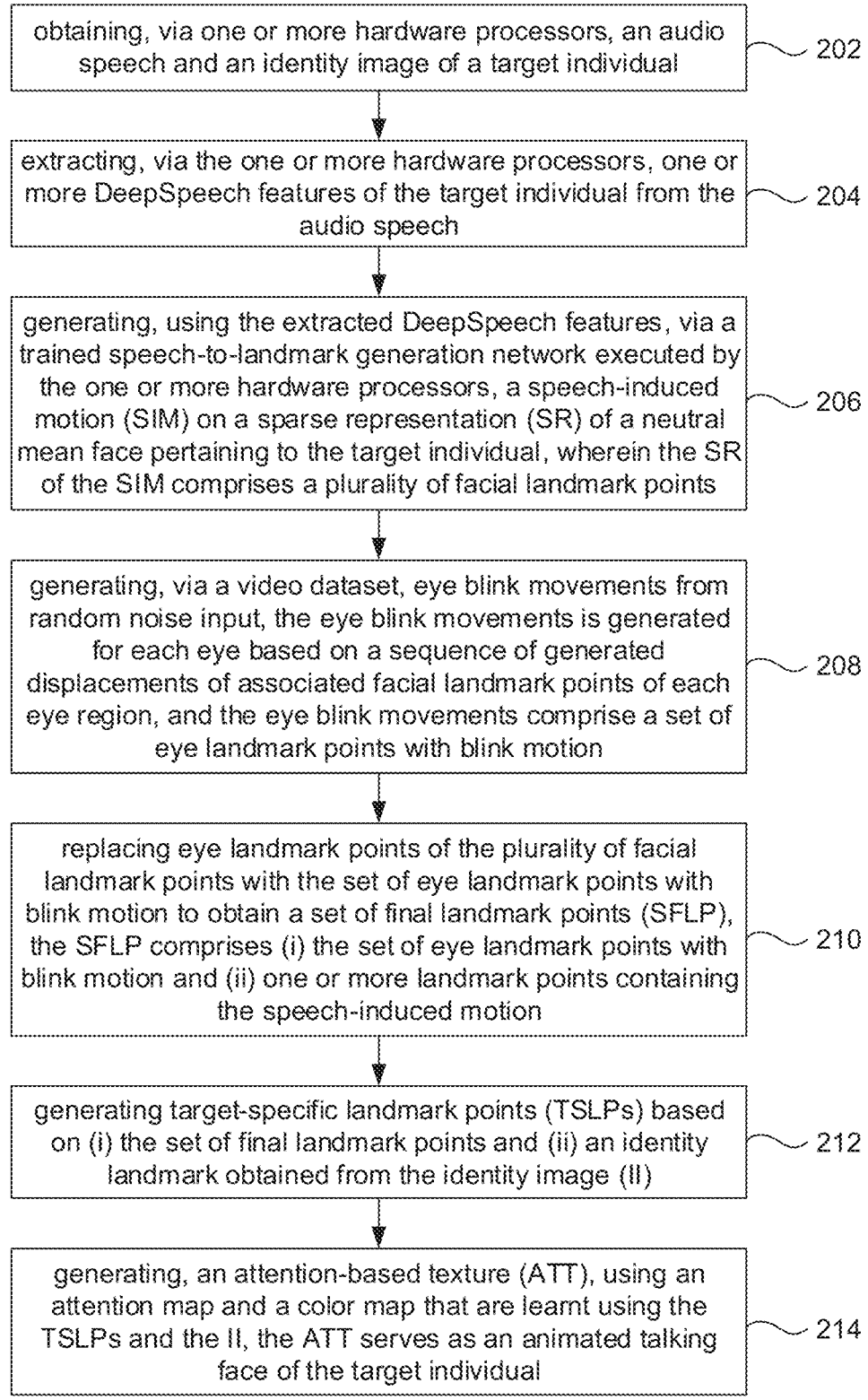
FIG. 5 depicts an exemplary flow chart illustrating a method for identity preserving realistic talking face generation using audio speech of a target individual using the system of FIG. 3, in accordance with an embodiment of the present disclosure.

FIG. 5, with reference to FIG. 1, depicts an exemplary flow chart illustrating a method for identity preserving realistic talking face generation using audio speech of a target individual using the system 100 of FIG. 3, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 3, the block diagram of FIG. 4, the flow diagram as depicted in FIG. 5 and diagrams of FIGS. 6 through 14. In an embodiment, at step 202 of the present disclosure, the one or more hardware processors 104 obtain an audio speech and an identity image of a target individual as depicted in FIG. 4. The identity image comprises an image containing a neutral facial expression of the target individual, in one example embodiment of the present disclosure. The identity image is a Red Green Blue (RGB) image, in another embodiment of the present disclosure. At step 204 of the present disclosure, the one or more hardware processors 104 extract, using the DeepSpeech features extraction technique executed by the one or more hardware processors, one or more DeepSpeech features of the target individual from the audio speech. At step 206 of the present disclosure, the one or more hardware processors 104 generate, using the extracted one or more DeepSpeech features, via a trained speech-to-landmark generation network executed by the one or more hardware processors, a speech-induced motion on a sparse representation of a neutral mean face pertaining to the at least one user. The sparse representation of the speech-induced motion comprises a plurality of facial landmark points. The above steps 202 till 206 are better understood by way of following description and examples, which shall not be construed as limiting the scope of the present disclosure.

For a given speech signal represented by a sequence of overlapping audio windows $A=\{A_0, A_1 \ldots A_t\}$, a speech-induced motion is predicted on a sparse representation of the face $l^P=\{l_0^P, l_1^P, \ldots l_t^P\}$ where $l_t^P \in \mathbb{R}^{68 \times 2}$ consists of 68 facial landmark points representing eyes, eyebrows, nose, lips, and jaw. Unlike the state-of-the-art methods, system and method of the present disclosure uses DeepSpeech features (also referred as DeepSpeech technique) instead of using audio MFCC features. DeepSpeech features are used for gaining robustness against noise and invariance to audio input from a variety of speakers. Facial landmarks for different subjects contain person-specific facial attributes i.e., different face structures, sizes, shapes, and different head positions. Speech driven lip movements for a given audio segment are independent of these variations. So to make landmark prediction invariant to these factors, system and method of the present disclosure consider a canonical landmark representation $l^m=\{l_0^m, l_1^m \ldots l_t^m\}$ where, $l_t^m \in \mathbb{R}^{68 \times 2}$, which is mean of facial landmarks over the entire dataset. System and method of the present disclosure consider a frontal face with closed lips as the neutral mean face, $l_N^m$. The speech-to-landmark generation network comprised in the system 100 is trained to predict displacements of canonical landmarks $\delta l^m=\{\delta l_0^m, \delta l_1^m \ldots \delta l_t^m\}$ where, $\delta l_t^m \in \mathbb{R}^{68 \times 2}$ represents displacement from the neutral mean face $l_N^m$. Person-specific facial landmarks $l_t^P$ is calculated from canonical landmark displacements $\delta l_t^m$ from $l_N^m$ using the below expression/equation:

$$l_t^P = \delta l_t^m * S_t + PA(l_N^P, l_N^m) \tag{1}$$

where, $PA(l_N^P, l_N^m)$ represents the rigid Procrustes alignment [24] of $l_N^P$ with $l_N^m$. $S_t$ represents scaling factor (ratio of height and width of person-specific face to mean face). $\delta l_t^m * S_t$ represents displacements of person-specific landmarks $\delta l_t^P$.

The speech-to-landmark generation network is trained with full supervision ($L_{lmark}$) for a one-to-one mapping of DeepSpeech features to landmark displacements which is expressed by way of following equation:

$$L_{lmark} = \|\delta l_t^m - \delta \hat{l}_t^m\|_2^2 \tag{2}$$

$\delta l_t^m$ and $\delta \hat{l}_t^m$ represents ground-truth and predicted canonical landmarks displacements.

A temporal loss ($L_{temp}$) is also used to ensure consistent displacements over consecutive frames as present in ground truth landmark displacements which is expressed by way of following equation.

$$L_{temp} = \|(\delta l_t^m - \delta l_{t-1}^m) - (\delta \hat{l}_t^m - \delta \hat{l}_{t-1}^m)\|_2^2 \tag{3}$$

Total loss ($L_{tot}$) for landmark prediction is defined as, $$L_{tot} = \lambda_{lmark} L_{lmark} + \lambda_{temp} L_{temp} \tag{4}$$

where $\lambda_{lmark}$ and $\lambda_{temp}$ define weightage of each of the losses.

Figure 6:
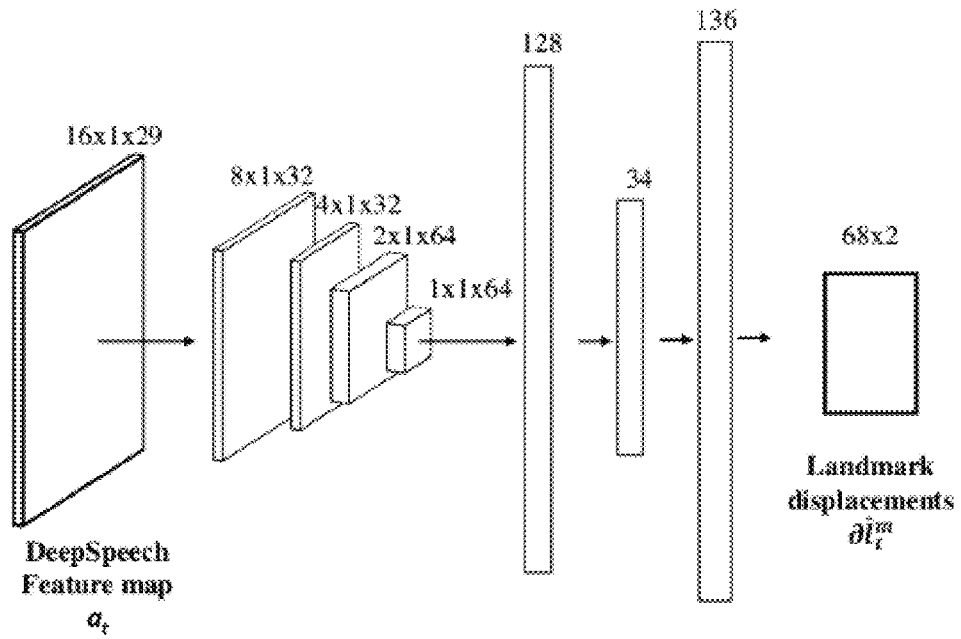
FIG. 6 depicts an encoder-decoder architecture of the speech-to-landmark generation network as implemented by the system of FIG. 3, in accordance with an embodiment of the present disclosure.

The sparse representation of the speech-induced motion comprising the plurality of facial landmark points is generated using a speech-to-landmark prediction architecture as depicted in FIG. 6. More specifically, FIG. 6, with reference to FIGS. 3 through 5, depicts an encoder-decoder architecture of the speech-to-landmark generation network as implemented by the system 100 of FIG. 3, in accordance with an embodiment of the present disclosure.

Referring to steps of FIG. 5, at step 208 of the present disclosure, the one or more hardware processors 104 generate, via one or more video datasets, a plurality of eye blink movements from random noise input. The plurality of eye blink movements are generated for each eye based on a sequence of generated displacements of associated facial landmark points of each eye region. The eye blink movements are generated from the random noise input by performing a comparison of the sequence of generated displacements of the associated facial landmark points of each eye region with one or more ground truth displacements, wherein one or more higher order moments (e.g., a first higher order moment, a second higher order moment, a third higher order moment and the like) of distribution of the sequence of generated displacements of the associated facial landmark points of each eye region are compared with the one or more ground truth displacements; and generating the plurality of eye blink movements based on the comparison. In an embodiment, the one or more higher order moments of the sequence of generated displacements of the associated facial landmark points of each eye region comprise one or more statistics of the distribution of the sequence of generated displacements. In an embodiment, the one or more statistics of the distribution of the sequence of generated displacements comprise at least one of a mean, a variance, and a skewness. In an embodiment, the one or more statistics (higher order moments) are used to find a measure of similarity or a dissimilarity between a distribution of (i) the plurality of eye blink movements and (ii) one or more ground truth eye blink movements. The similarity or the dissimilarity is found using the Maximum Mean Discrepancy (MMD) loss. In other words, the one or more statistics of the distribution of the sequence of generated displacements comprise at least one of a mean, a variance, and a skewness, wherein the Maximum Mean Discrepancy (MMD) loss is computed using the one or more statistics. The MMD loss is a measure of a similarity or a dissimilarity between a distribution of (i) the plurality of eye blink movements and (ii) one or more ground truth eye blink movements.

The plurality of eye blink movements comprises a set of eye landmark points with blink motion, in one embodiment of the present disclosure. At step 210 of the present disclosure, the one or more hardware processors 104 replace one or more eye landmark points of the plurality of facial landmark points with the set of eye landmark points with blink motion to obtain a set of final landmark points. The set of final landmark points comprises (i) the set of eye landmark points with blink motion and (ii) one or more landmark points containing the speech-induced motion.

The generation of plurality of eye blink movements from random noise input and the step of replacing one or more eye landmark points of the plurality of facial landmark points with the set of eye landmark points with blink motion to obtain a set of final landmark points are better understood by the following description serving as embodiments of the present disclosure.

Unlike conventional approaches which use landmarks for facial animation as described in Chen et al., system and method of the present disclosure impose eye blinks on the facial landmarks for adding realism to the facial animation. Unlike end-to-end methods that generate natural facial expressions and eye blinks (e.g., refer 'Vougioukas et al.'), the system and method of the present disclosure learn/generate blink movements over the sparse landmark representation for better preservation of identity related texture.

Figure 7:
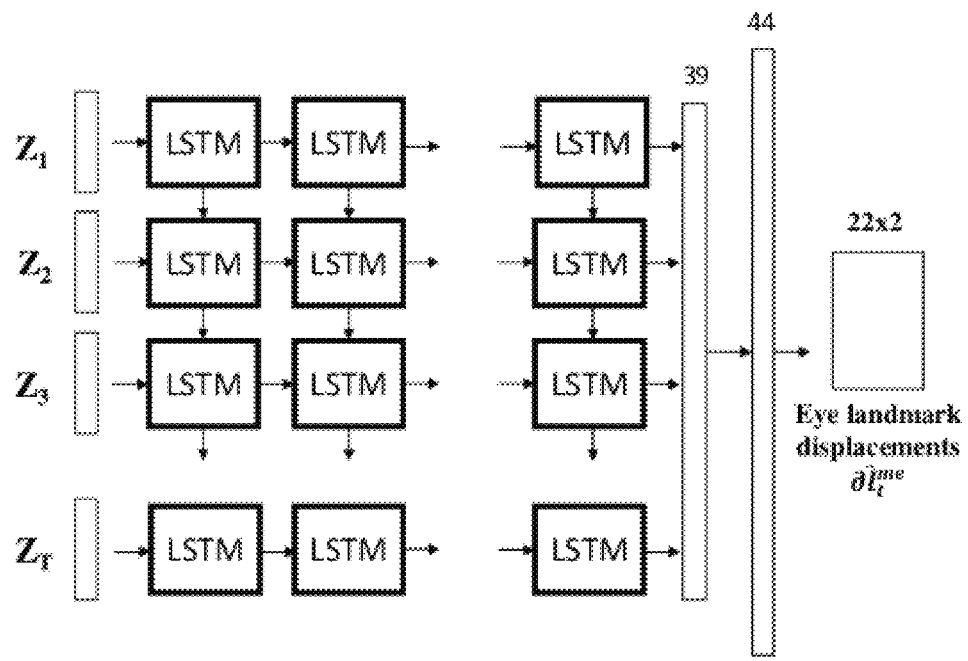
FIG. 7 depicts a block diagram of a blink generation network comprised in the system of FIG. 3 for generating a plurality of blink movements, in accordance with an embodiment of the present disclosure.

A blink generation network comprised in the system 100 is trained to learn/generate a realistic eye blink, duration of eye blinks and permissible intervals between two blinks from the training datasets. As there is no dependency of blinks on speech input, the trained blink generation network generates blinks in an unsupervised manner only from random noise input sampled from a Gaussian distribution. Blink patterns, blink frequencies and blink duration are learnt over the training dataset via unsupervised learning. In literature, generative adversarial networks (GAN) have been used for image generation from random noise input (e.g., refer 'Goodfellow et al.'). Training of GAN requires optimization of a min-max problem, which is often difficult to stabilize. Li et al. (e.g., refer "Y. Li, K. Swersky, and R. Zemel. Generative moment matching networks. In International Conference on Machine Learning, pages 1718-1727, 2015.") proposed a simpler category of GAN where the discriminator is replaced with a straightforward loss function that matches different moments of ground-truth (real) and predicted (fake) distributions using maximum mean discrepancy (MMD) (e.g., refer "A. Gretton, K. Borgwardt, M. Rasch, B. Sch¨olkopf, and A. J. Smola. A kernel method for the two-sample-problem. In Advances in neural information processing systems, pages 513-520, 2007.", herein referred as Gretton et al. and may be interchangeably used). System and method of the present disclosure use MMD loss $L_{MMD2}$ to match distribution of each landmark displacements over a sequence length T.

$$L_{MMD2} = \frac{1}{N^2}\sum_{i=1}^{N}\sum_{i'=1}^{N}k(\delta l_i^{me}, \delta l_{i'}^{me}) - \frac{2}{NM}\sum_{i=1}^{N}\sum_{j=1}^{M}k(\delta l_i^{me}, \hat{\delta l}_j^{me}) - \frac{1}{M^2}\sum_{j=1}^{M}\sum_{j'=1}^{M}k(\hat{\delta l}_j^{me}, \hat{\delta l}_{j'}^{me}) \quad (5)$$

where, $$k(x, y) = \exp\left(-\frac{|x-y|^2}{2\sigma}\right)$$

is used as the kernel for comparing the real and fake distributions. $\delta l^{me}$ and $\hat{\delta l}^{me}$ represent ground truth and predicted distribution of displacements of each of the landmark points in eye region over sequence T. System and method of the present disclosure also use min-max regularization on predicted distributions to enforce it to be within the range of average displacements seen in the training dataset. FIG. 7, with reference to FIGS. 3 through 6, depicts a block diagram of the blink generation network comprised in the system 100 of FIG. 3 for generating the plurality of blink movements, in accordance with an embodiment of the present disclosure.

Referring to steps of FIG. 5, at step 212 of the present disclosure, the one or more hardware processors 104 generate one or more target-specific landmark points based on (i) the set of final landmark points and (ii) an identity landmark obtained from the identity image. The one or more target-specific landmark points (also referred as person-specific landmarks and may be interchangeably used herein) are depicted in FIG. 4 (e.g., refer output from motion generation block of FIG. 4). At step 214 of the present disclosure, the one or more hardware processors 104 generate, an attention-based texture, using an attention map and a color map that are learnt using the one or more target-specific landmark points and the identity image. The attention-based texture serves as an animated talking face of the target individual, in one embodiment of the present disclosure. The steps 212 and 214 are better understood by the following description serving as embodiments of the present disclosure.

Given a single image of the target identity $I_{id}$, the objective is to transform a sequence of person-specific facial landmarks $l^P = \{l_0^P, l_1^P \ldots l_t^P\}$ into a sequence of photo-realistic images $I = \{I_0, I_1 \ldots I_t\}$ that accurately reflect the facial expressions corresponding to the input landmark images L (image representation of the 68×2 landmarks $l^P$). A generative adversarial network (or attention-based texture generation network or attention-based texture generator or texture generation network) is trained using ground truth video frames I* and the corresponding ground-truth landmark images L*. Since the texture generation network is trained on ground-truth landmarks, the texture generation network learns to generate face texture for eye blinks. During evaluation, the speech-driven landmarks with imposed eye blinks are used as input for texture generation.

The generative adversarial network comprised in the memory 102 of the system 100 when executed focuses on generating unique texture for image regions that are responsible for facial expressions (defined by motion on landmarks), while retaining texture from $I_{id}$ in the rest of the image. This is achieved by learning/generating a grayscale attention map and an RGB color map over the face image instead of directly regressing the entire face image. The attention map and color map generation are depicted in FIG. 4 (e.g., refer attention map and color map outputs generated in intermediary stages of the texture generation block of FIG. 4). The pixel intensity values of the attention map $att_t$ denotes how much of the original texture values in $I_{id}$ may be present in the final generated image $I_t$. The color map $C_t$ contains the novel texture in the regions of facial motion. The final generated image $I_t$ is derived as follows:

$$I_t = (1-att_t)*C_t + att_t*I_{id} \quad (6)$$

The network is trained by minimizing the following loss functions:

Pixel Intensity Loss:

This is a supervised loss on the RGB intensity values of the entire image with a special emphasis on the eyes and mouth regions.

$$L_{pix} = \Sigma_t \alpha_t \|I_t - I_t^*\| \quad (7)$$

where, a represents a fixed spatial mask representing weights assigned to individual pixels for contributing to the overall loss, with higher weights assigned to the regions surrounding the mouth and eyes. A fixed a has been experimentally found to be more stable than a dynamic pixel mask dependent on $att_t$.

Adversarial Loss:

Using only the pixel intensity loss $L_{pix}$ results in considerable blur in generated image due to the $L_1$ distance minimization. A discriminator network has been implemented by the system 100 and method of the present disclosure to make the generated texture sharper and more distinct especially in regions of motion. LSGAN, as known in the art, has been implemented for adversarial training of the texture generation network, because of its better training stability as well as its ability to generate higher quality images than the regular GAN. Regular GANs use the sigmoid cross entropy loss function, which is prone to the problem of vanishing gradients. The LSGAN helps overcome this problem by using the least squares loss function which penalizes samples which are correctly classified yet far from the decision boundary, unlike regular GANs. Due to this property of LSGANs, generation of samples is closer to real data. The LSGAN loss functions for the discriminator and generator are:

$$L(D) = \frac{1}{2}\mathbb{E}_{x\sim p_I(x)}[(D(x)-1)^2] + \frac{1}{2}\mathbb{E}_{z\sim p_z(z)}[D(G(z))^2] \quad (8)$$

$$L(G) = \frac{1}{2}\mathbb{E}_{z\sim p_z(z)}[(D(G(z))-1)^2] \quad (9)$$

where $p_I$ is the distribution of the real face images and $p_z$ is the distribution of the latent variable z. The adversarial loss $L_{adv}$ is computed as follows:

$$L_{adv}=L(G)+L(D) \quad (10)$$

Regularization Loss:

No ground-truth annotation is available for training the attention map and color map. Low values of the attention map in the regions of the face other than the regions of motion would result in blurring of the generated texture. Hence, a $L_2$ regularization is applied to prevent the attention map values from becoming too low.

$$L_{att}=\Sigma_t\|1-att_t\|_2 \quad (11)$$

To ensure the continuity in the generated images, a temporal regularization is also applied by minimizing first-order temporal differences of attention and color maps.

$$L_{temp}=\Sigma_t\|(att_t-att_{t-1})_2+\Sigma_t\|(C_t-C_{t-1})\|_2 \quad (12)$$

The total regularization loss is:

$$L_{reg}=L_{att}+L_{temp} \quad (13)$$

The final objective function of generator is to minimize the following combined loss:

$$L=\lambda_{pix}L_{pix}+\lambda_{adv}L_{adv}+\lambda_{reg}L_{reg} \quad (14)$$

$\lambda_{pix}$, $\lambda_{adv}$ and $\lambda_{reg}$ are hyper-parameters for optimization, that control the relative influence of each loss term.

Below exemplary description provides one way of system 100 being implemented and such exemplary description shall not be construed as limiting the scope of the present disclosure.

Audio Feature Extraction:

Given an audio input, DeepSpeech technique (also referred as 'DeepSpeech network' or 'DeepSpeech features extraction technique' and interchangeably used hereinafter) produces log probabilities of each character (26 alphabets+3 special characters) corresponding to each audio frame. Output of the last layer of the pre-trained DeepSpeech network was used before applying softmax. Overlapping audio windows of 16 audio frames (0.04 seconds of audio) were used, where each audio window corresponds to a single video frame. This gave an audio feature, $a=\{a_0, a_1, \ldots a_t\}$; $a_t \in \mathbb{R}^{16\times29}$, for n=fT frames of a video of T seconds duration with frame rate of f FPS.

Extraction of Facial Landmarks:

Techniques such as OpenFace and face segmentation as known in the art were implemented by the system and method of the present disclosure to prepare ground truth facial landmarks for training audio-to-landmark prediction network. For a given face image, OpenFace predicted 68 facial landmarks and used frame-wise tracking to obtain temporally stable landmarks. But for the lip region, it often gives erroneous prediction especially for the frames with faster lip movements. To capture an exact lip movement corresponding to input audio, a more accurate method is needed for the ground truth landmark extraction. Hence, face segmentation as known in the art technique was implemented by the system and method of the present disclosure, wherein the entire face was segmented in different regions like hair, eyes, nose, upper lip, lower lip, and rest of the face. Upper and lower lip landmarks are selected from the boundary of lip segments with the help of OpenFace predicted landmark points, which gives quite accurate estimations of lip landmarks.

To prepare ground-truth landmark displacements for training audio-to-landmark prediction network (or speech-to-landmark generation network) lip movements were imposed on the mean neutral face by assigning the displacement of lips, $\delta l_t^p$ from a neutral face with closed lips, $l_N^p$ in person-specific landmarks. For this, the person-specific landmark $l^p$ were aligned with the mean face landmark $l_N^m$ using rigid Procrustes alignment. Per frame lip displacements from the person-specific neutral face, was added with the mean neutral face, $l_N^m$ to transfer the motion from person specific landmarks to mean face landmarks, $l^m$. Displacements were scaled with the ratio of person-specific face height-width to mean face heightwidth before adding to $l_N^m$.

An encoder-decoder architecture (as shown in FIG. 6) was implemented by the system and method of the present disclosure for predicting the landmark displacements. The encoder network consists of four convolution layers with two linear layers in the decoder. Leaky ReLU activation was used after each layer of the encoder network. Input audio feature $a_i$ was reshaped as $\mathbb{R}^{16\times1\times29}$ to consider the temporal relationship within the window of 16 audio frames. Decoder layer's weight was initialized with PCA components (that represents 99% of total variance) computed over landmark displacements of the mean face of training samples. The loss parameters $\lambda_{lmark}$ and $\lambda_{temp}$ were set to 1 and 0.5 respectively based on experimental validation.

Blink Generation Network:

Recurrent Neural Network (RNN) architecture has been implemented by the system and method of the present disclosure to predict a sequence of displacements for each of the landmark points of eye region (n×T×44, i.e., x, y coordinates of 22 landmarks; n is batch size) over T timestamps from given noise vector $z\sim\mathcal{N}(\mu, \sigma^2)$ of size 10 (n×T×44). FIG. 7 shows Recurrent Neural Network architecture for the blink generation network. Similar to the audio-to-landmark prediction network, the blink generation network was also trained on landmark displacements. The last linear layer weight was initialized with PCA components (with 99% variance) computed using eye landmark displacements.

Figure 8:
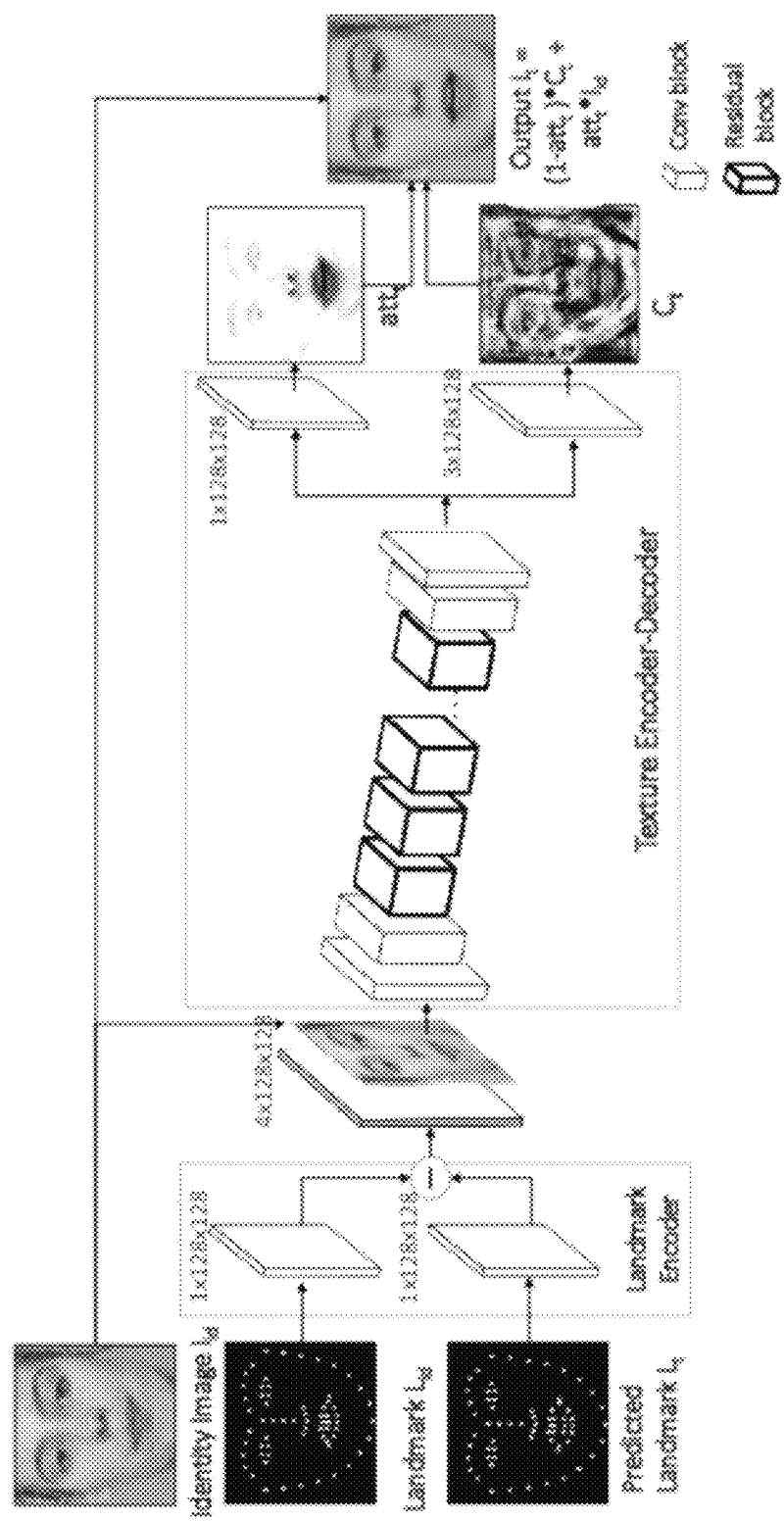
FIG. 8 depicts an attention-based texture generation network implemented by the system of FIG. 3 for identity preserving realistic talking face generation using audio speech of the target individual, in accordance with an embodiment of the present disclosure.

Texture Generation from Landmarks:

The architecture of the texture generator is shown in FIG. 8. More specifically, FIG. 8, with reference to FIGS. 3 through 7, depicts an attention-based texture generation network implemented by the system 100 of FIG. 3 for identity preserving realistic talking face generation using audio speech of the target individual, in accordance with an embodiment of the present disclosure. The current landmark images $L_t$ and the identity landmark image $L_{id}$ images were each encoded using a landmark encoder. The difference in encoded landmark features was concatenated with the input identity image $I_{id}$ and fed to an encoder-decoder architecture which generated attention map $att_t$ and color map $C_t$. The generated image $I_t$ was then passed to a discriminator network which determines if the generated image is real or fake. The encoder-decoder architecture of the generator network uses facial action units to generate attention for facial expression generation. The discriminator network is based on the PatchGan architecture (e.g., refer "P. Isola, J.-Y. Zhu, T. Zhou, and A. A. Efros. Image-to-image translation with conditional adversarial networks. In Proceedings of the IEEE conference on computer vision and pattern recognition, pages 1125-1134, 2017.") with batch normalization replaced by instance normalization for greater training stability. The improved stability of Least Squares Generative Adversarial Network (LSGAN) training along with regularization of attention map, helped the present disclosure in achieving stable adversarial training as the problem of vanishing gradients in the regular GAN training can adversely affect learning of attention and color maps. Adam optimizer comprised in the system 100 was implemented by the method of the present disclosure with learning rate of 0.0001, β1=0.5, β2=0.999 and training batch size of 16. During training, the loss hyperparameters were set to $\lambda_{pix}$=100, $\lambda_{adv}$=0.5 and $\lambda_{reg}$=0.2 by experimental validation on a validation set. The adversarial loss and regularization loss parameters were suitably chosen to prevent saturation of the attention map while maintaining the sharpness of texture of the generated images.

Networks comprised in the system 100 and as mentioned above were trained on a NVIDIA Quadro GV100 GPU. Training of audio-to-landmark, blink, and landmark-to-image generation networks took around 6 hours, 3 hours and 2 days, respectively. PyTorch was used by the system 100 for implementation of the above-mentioned networks.

Experimental Results:

The system of the present disclosure and its method were trained and evaluated on the benchmark datasets GRID (e.g., refer "M. Cooke, J. Barker, S. Cunningham, and X. Shao. An audio-visual corpus for speech perception and automatic speech recognition. The Journal of the Acoustical Society of America, 120(5):2421-2424, 2006.", herein referred as 'Cooke' and may be interchangeably used) and TCD-TIMIT (e.g., refer "N. Harte and E. Gillen. Tcd-timit: An audio-visual corpus of continuous speech. IEEE Transactions on Multimedia, 17(5):603-615, 2015.", herein referred as 'Harte et al.' and may be interchangeably used) datasets. The GRID dataset consisted of 33 speakers each uttering 1000 short sentences, but the words belonged to a limited dictionary. The TCD-TIMIT dataset (e.g., refer 'https://sigmedia.tcd.ie/TCDTIMIT/') consisted of 59 speakers uttering approximately 100 sentences each from the TIMIT corpus, with long sentences that contain much more phonetic variability than the GRID dataset (e.g., refer (e.g., refer 'http://spandh.dcs.shef.ac.uk/gridcorpus/'). System and method of the present disclosure use the same training-testing data split for the TCD-TIMIT and GRID datasets as in existing research work of Vougioukas et al.

Metrics:

The following metrics were used for quantitative evaluation of experimental results conducted by the system and method of the present disclosure:
1. Image reconstruction quality metrics, PSNR (peak signal-to-noise ratio), and SSIM (structural similarity).
2. Image sharpness metric CPBD (Cumulative probability blur detection) to detect the amount of blur in synthesized image.
3. Landmark synchronization metric LMD (landmark distance) to measure the accuracy of audio-visual synchronization.

Higher values of CPBD, PSNR and SSIM indicated better quality of image generation while lower values of LMD indicate better audio-visual synchronization.

Figure 9A:
FIGS. 9A-9B depict a comparison of results of the method of the present disclosure vis-à-vis conventional methods, the results are obtained using a TCD-TIMIT dataset, in accordance with an embodiment of the present disclosure.
Figure 9B:
Figure 10A:
FIGS. 10A-10B depict a comparison of results of the method of the present disclosure vis-à-vis conventional methods, the results are obtained using a GRID dataset, in accordance with an embodiment of the present disclosure.
Figure 10B:
Figure 11:
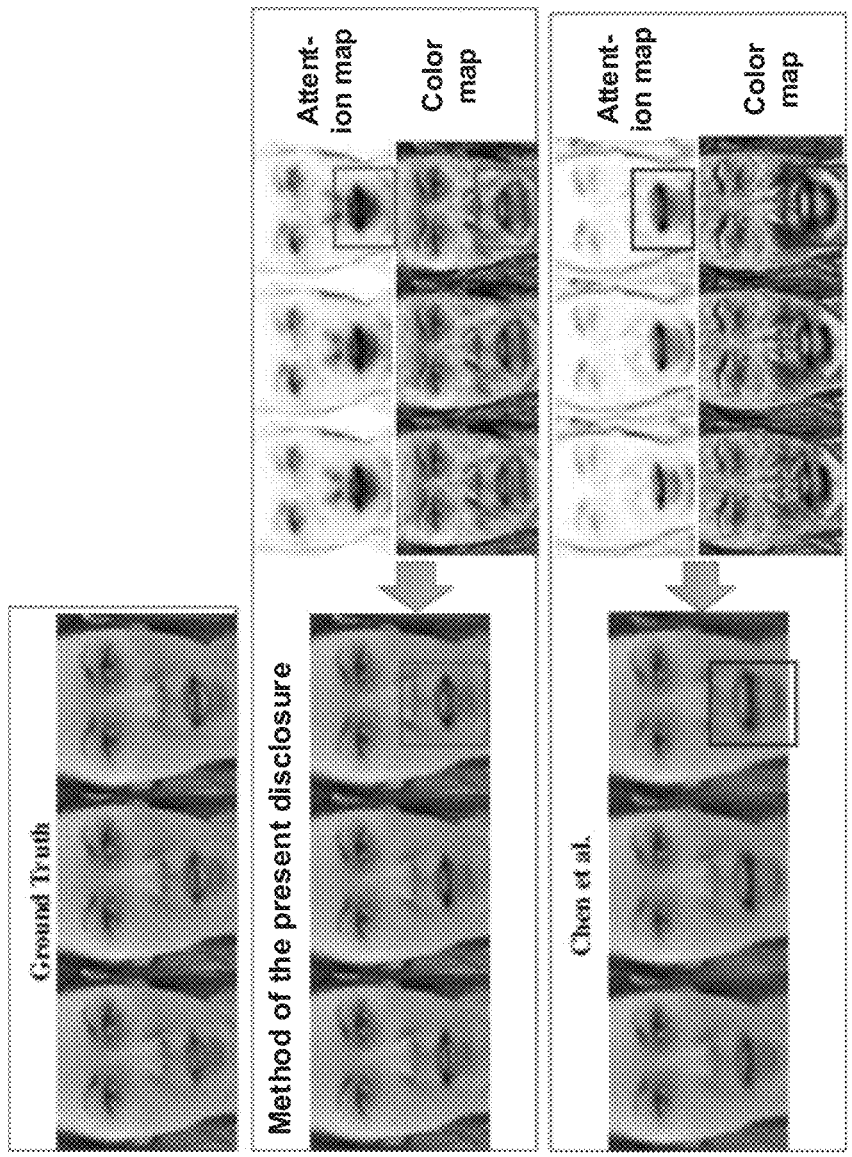
FIG. 11 depicts a comparison of effect of intermediate attention map and color map on a final texture between conventional method of Chen et al., and method of the present disclosure, in accordance with an embodiment of the present disclosure.
Figure 12:
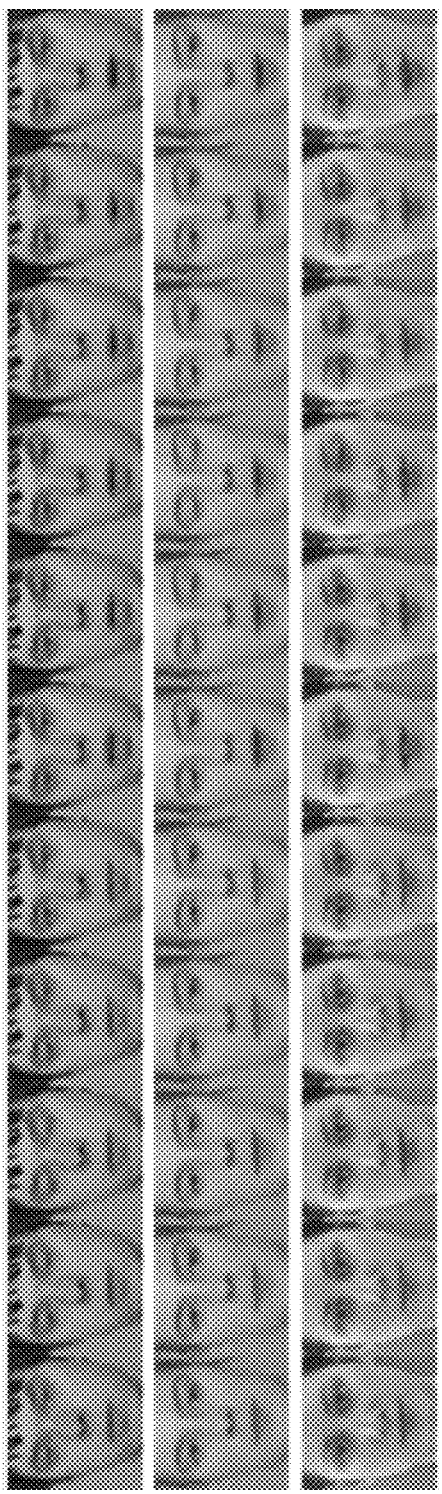
FIG. 12 depicts animation of different identities generated by the system of FIG. 3 and which are synchronized with the same speech input, containing spontaneous generation of eye blinks, in accordance with an embodiment of the present disclosure.

Results:

Results of the present disclosure have been compared both qualitatively and quantitatively with recent state-of-the-art methods. A user study was also carried out for subjective evaluation of the method of the present disclosure.
1. Qualitative Results: Qualitative comparison of results of the present disclosure have been carried out with the recent state-of-the-art methods of existing research works of Chen et al., Vougioukas et al. and Zhou et al. The comparative results on TCD-TIMIT and GRID dataset are shown in FIGS. 9A through 10B, respectively. More specifically, FIGS. 9A-9B, with reference to FIGS. 3 through 8, depict a comparison of results of the method of the present disclosure vis-à-vis conventional methods, the results are obtained using a TCD-TIMIT dataset, in accordance with an embodiment of the present disclosure. FIGS. 10A-10B, with reference to FIGS. 3 through 9B, depict a comparison of results of the method of the present disclosure vis-à-vis conventional methods, the results are obtained using a GRID dataset, in accordance with an embodiment of the present disclosure. As depicted in FIGS. 9A through 9B, texture generated by the method of the present disclosure is sharper, especially the texture of the mouth and teeth are visibly more distinct compared to Chen et al., Vougioukas et al. and Zhou et al., and also better mouth movements than Zhou et al. Compared to Vougioukas et al. synthesized face as generated by the method of the present disclosure retains the identity-related texture from the upper regions of the face not undergoing motion. Further, as depicted in FIGS. 10A-10B, images generated by the system 100 and method of the present disclosure contain sharper and more distinctive mouth texture, plausible mouth shapes, and better preservation of identity compared to Chen et al., Vougioukas et al. and Zhou et al. More specifically, Vougioukas et al. fail to preserve the identity information of the target in the synthesized images, Chen et al. and Zhou et al. contain some implausible mouth shapes. In other words, the results indicate that the method of the present disclosure can generate facial animation sequences that are superior in terms of image quality, identity preservation and generation of plausible mouth shapes. Compared to Vougioukas et al. and Zhou et al., images generated by the method of the present disclosure contained sharper texture and were better at preserving the identity-related facial texture of the target subjects. Unlike existing research work of Vougioukas and Zhou et al., the attention-based mechanism with intermediate landmark stage of the present disclosure, helps to retain the identity information from the input identity image. Compared to existing research work of Chen et al. and Zhou et al., face images generated by the method of the present disclosure have less blur and more distinctive texture in the mouth region and plausible mouth shapes. This is because of present disclosure's two-step learning of person-specific facial landmarks, and texture generation using LSGAN and attention map regularization. FIG. 11, with reference to FIGS. 3 through 10B, depicts a comparison of effect of intermediate attention and color map on the final texture between conventional method of Chen et al., and method of the present disclosure, in accordance with an embodiment of the present disclosure. Intermediate attention values (gray areas) of extended regions surrounding the lips in the attention map generated by Chen et al. (last row) results in the blurred texture and unusual shape of the mouth in the animated face (last frame). Whereas uniformly low attention values (dark areas) in the mouth region in our attention map and distinct lip shape and texture in our color map leads to generation of sharp facial texture with plausible shape of the mouth. The actual attention map (where higher values indicate regions with more significant motion) generated by Chen et al. is inverted here for direct comparison with our attention map (lower values indicate regions with more significant motion) Unlike existing research work of Chen et al. and Zhou et al., the face animation method of the present disclosure can generate spontaneous eye blinks, as shown in FIG. 12. More specifically, FIG. 12, with reference to FIGS. 3 through 11, depicts animation of different identities generated by the system 100 of FIG. 3 and which are synchronized with the same speech input, containing spontaneous generation of eye blinks, in accordance with an embodiment of the present disclosure.

2. Quantitative Results: A quantitative evaluation of the method of the present disclosure is compared with the methods existing research work of Chen et al. and Vougioukas et al. Table 1 shows the metrics computed using present disclosure's trained models on GRID and TCD-TIMIT datasets, respectively.

TABLE 1

| Dataset | Method | PSNR | SSIM | CPBD | LMD |
|---|---|---|---|---|---|
| TCD-TIMIT | Present disclosure | 26.153 | 0.818 | 0.386 | 2.39 |
|  | Vougioukas et al. (prior art) | 24.243 | 0.730 | 0.308 | 2.59 |
|  | Chen et al. (prior art) | 20.311 | 0.589 | 0.156 | 2.92 |
| GRID | Present disclosure | 29.305 | 0.878 | 0.293 | 1.21 |
|  | Vougioukas et al. (prior art) | 27.100 | 0.818 | 0.268 | 1.66 |
|  | Chen et al. (prior art) | 23.984 | 0.7601 | 0.0615 | 1.59 |

The results of the present disclosure indicate better image reconstruction quality (higher PSNR and SSIM), sharper texture (higher CPBD) and improved audio-visual synchronization (lower LMVD) than the state-of-the-art methods described by Chen et al. and Vougioukas et al.

Figure 13:
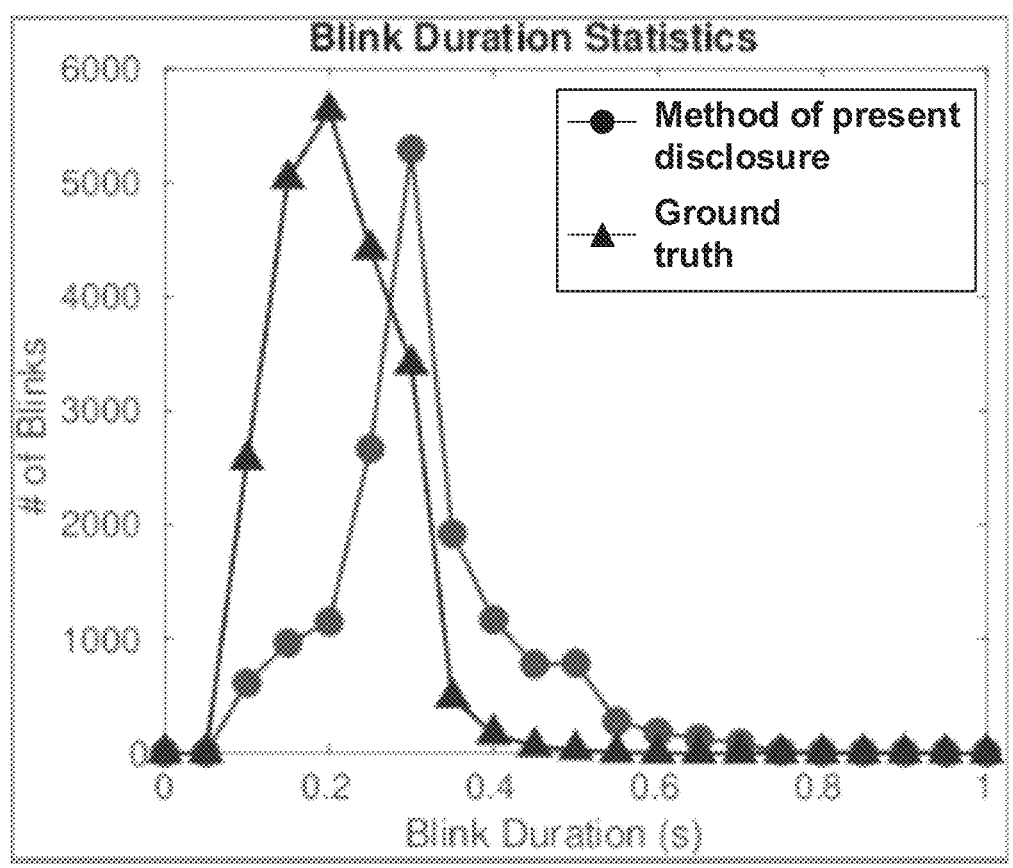
FIG. 13 depicts a graphical representation of blink duration in synthesized videos compared to ground-truth, in accordance with an embodiment of the present disclosure.

The present disclosure also evaluates the performance of blink generation network of the system 100 by comparing the characteristics of predicted blinks with blinks present in ground-truth videos. FIG. 13 shows the comparison of the distributions of blink duration for around 11,000 synthesized (red) and ground-truth (blue) videos (from GRID and TCD-TIMIT datasets). More specifically, FIG. 13, with reference to FIGS. 3 through 12, depicts a graphical representation of blink duration in synthesized videos compared to ground-truth, in accordance with an embodiment of the present disclosure. As can be observed in FIG. 13, the system and method of the present disclosure generated similar distribution of blink duration compared to ground-truth. The method of the present disclosure produced 0.3756 blinks/s and 0.2985 blinks/s for GRID and TCD-TIMIT datasets respectively which is similar to average human blink rate, that varies between 0.28-0.4 blinks/s (refer 'Vougioukas et al.'). Also, the method of the present disclosure shows an average of 0.5745 s inter-blink duration which is similar to ground-truth videos with duration 0.4601 s. Hence, the method of the present disclosure can produce realistic blinks.

3. Ablation Study: An ablation study is presented on a validation set from TCD-TIMIT, for different losses (refer equation (14)) used for training the landmark-to-image generation network of the system 100.

Figure 14:
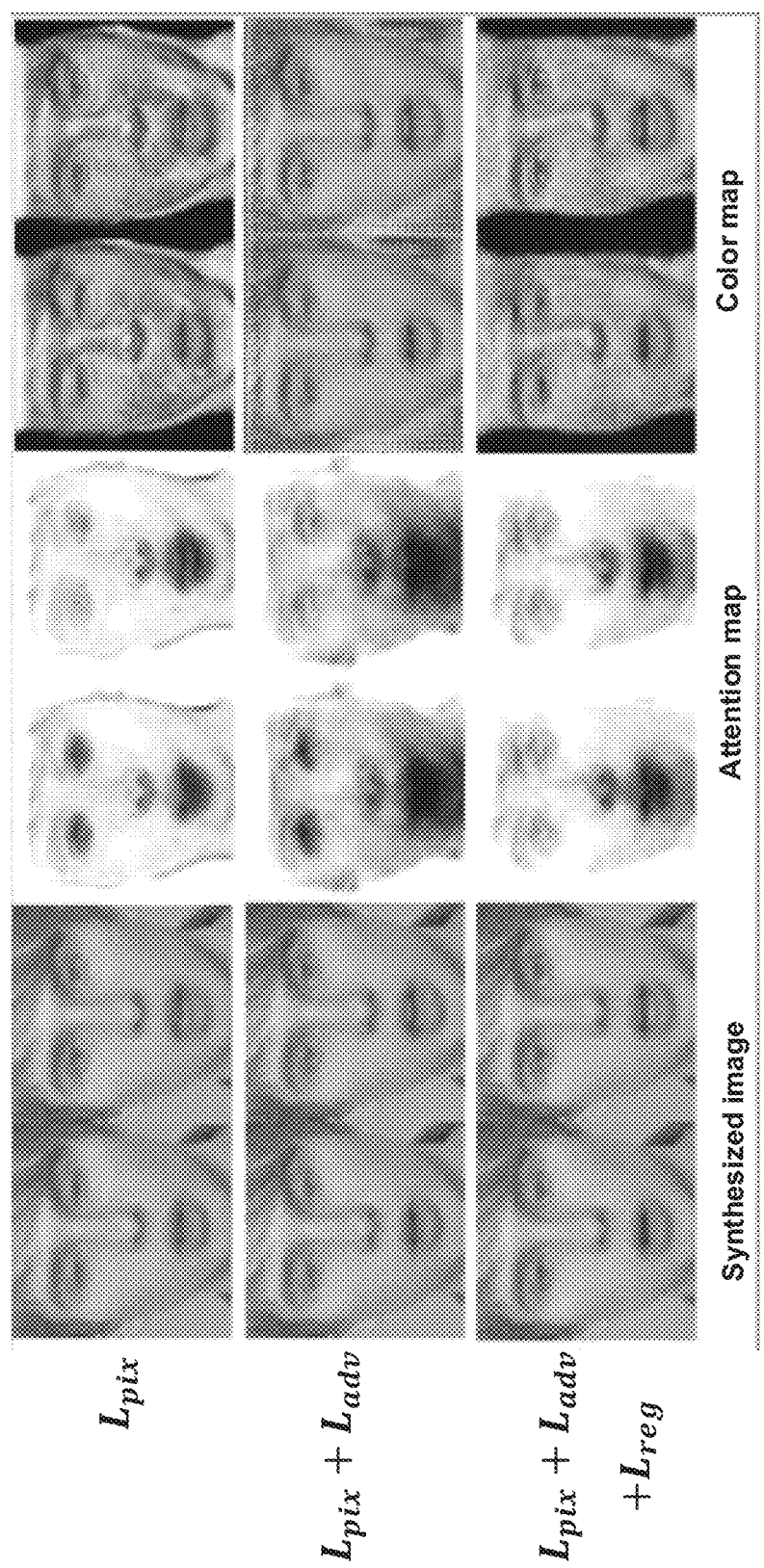
FIG. 14 depicts synthesized images (e.g., attention-based texture output of step of FIG. 3) generated by the system of FIG. 3 by incorporating (i) a pixel intensity loss only $L_{pix}$, (ii) the pixel intensity loss $L_{pix}$ and an adversarial loss $L_{adv}$, and (iii) the pixel intensity loss $L_{pix}$, the adversarial loss $L_{adv}$ and a regularization loss $L_{reg}$ respectively, in accordance with an embodiment of the present disclosure.

This helps to understand the significance of using adversarial training and regularization. The metrics are summarized in Table 2 and generated images are shown in FIG. 14. More specifically, FIG. 14, with reference to FIGS. 3 through 13, depicts synthesized images (e.g., attention-based texture output of step 214) generated by the system 100 of FIG. 3 by incorporating (i) pixel intensity loss only $L_{pix}$, (ii) the pixel intensity loss $L_{pix}$ and the adversarial loss $L_{adv}$, and (iii) the pixel intensity loss $L_{pix}$, the adversarial loss $L_{adv}$ and the regularization loss $L_{reg}$ respectively, in accordance with an embodiment of the present disclosure. In other words, FIG. 14 depicts training one or more networks of the system 100 of FIG. 3 using only generator loss $L_{pix}$ without the discriminator, results in blurry texture generation in the mouth region of the color map. Adding the discriminator and the adversarial loss (row marked $L_{pix}$+$L_{adv}$) makes the generated mouth texture sharper in the color map, however the attention map indicates motion for the entire face resulting in blur in the final synthesized image, especially noticeable in the mouth region. Adding the regularization loss (row marked $L_{pix}$+$L_{adv}$+$L_{reg}$) results in the attention map having low values mostly in regions of motion, hence the synthesized image contains sharper and more distinct mouth texture.

TABLE 2

| Method | PSNR | SSIM | CPBD |
|---|---|---|---|
| $L_{pix}$ | 25.874 | 0.813 | 0.366 |
| $L_{pix} + L_{adv}$ | 25.951 | 0.814 | 0.373 |
| $L_{pix} + L_{adv} + L_{reg}$ | 26.153 | 0.818 | 0.386 |

The results in above Table 2 indicate that texture generation network of the present disclosure trained using a combination of $L_1$ pixel loss, adversarial loss and regularization yields the best outcome.

4. User Study: A user study was also carried out to evaluate the realism of the facial animation results of the present disclosure. 26 participants rated 30 videos with a score between 0-10 (higher score indicates more realistic). Out of the 30 videos, 10 videos were selected from each of the following methods—method of the present disclosure, Vougioukas et al. (existing research work) and Chen et al. (existing research work). For each method, 5 videos were selected from each of the datasets, GRID, and TCD-TIMIT. Table 3 summarizes the outcome of the user study, which indicates higher realism for the synthesized videos generated by the method of the present disclosure.

TABLE 3

| Method | TCD-TIMIT | GRID | Average |
|---|---|---|---|
| Present disclosure | 6.40 | 7.69 | 7.05 |
| Vougioukas et al. (prior art) | 6.29 | 6.51 | 6.4 |
| Chen et al. (prior art) | 4.67 | 4.5 | 4.59 |

As per the feedback from the participants, output of the present disclosure comprising sharper images, better identity preservation over the videos, and the presence of realistic eye blinks helped the present disclosure achieve higher scores indicating improved realism compared to state-of-the-art methods.

Embodiments of the present disclosure implement system and method—an approach for an efficient pipeline for generating realistic facial animation from speech. The method of the present disclosure produced accurate audio-visual synchronization, plausible mouth movement along with identity preservation and rendered natural expression like eye blinks. The results of the method of the present disclosure indicate significant improvement over the state-of-the-art methods in terms of image quality, speech-synchronization, identity-preservation and overall realism, as established by our qualitative, quantitative and user study results wherein the present disclosure attributes to segregated learning of motion and texture, two-stage learning of person-independent and person-specific motion, generation of eye blinks, and the use of attention to retain identity information as being implemented and described herein.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A processor implemented method, comprising:
obtaining, via one or more hardware processors, an audio speech and an identity image of a target individual;

extracting, via the one or more hardware processors, one or more DeepSpeech features of the target individual from the audio speech;

generating, using the extracted one or more DeepSpeech features, via a trained speech-to-landmark generation network executed by the one or more hardware processors, a speech-induced motion on a sparse representation of a neutral mean face pertaining to the at least one user, wherein the sparse representation of the speech-induced motion comprises a plurality of facial landmark points;

generating, via a video dataset, a plurality of eye blink movements from random noise input, wherein the plurality of eye blink movements are generated for each eye based on a sequence of generated displacements of associated facial landmark points of each eye region, and wherein the plurality of eye blink movements comprise a set of eye landmark points with blink motion;

replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion;

generating one or more target-specific landmark points based on (i) the set of final landmark points and (ii) an identity landmark obtained from the identity image; and generating, an attention-based texture, using an attention map and a color map that are learnt using the one or more target-specific landmark points and the identity image, wherein the attention-based texture serves as an animated talking face of the target individual.

2. The processor implemented method of claim 1, wherein the identity image comprises an image containing a neutral facial expression of the target individual.

3. The processor implemented method of claim 1, wherein the step of generating, via a video dataset, a plurality of eye blink movements from random noise input, comprises:

performing a comparison of the sequence of generated displacements of the associated facial landmark points of each eye region with one or more ground truth displacements, wherein one or more higher order moments of distribution of the sequence of generated displacements are compared with the one or more ground truth displacements; and generating the plurality of eye blink movements based on the comparison.

4. The processor implemented method of claim 3, wherein the one or more higher order moments of the sequence of generated displacements comprise one or more statistics of the distribution of the sequence of generated displacements.

5. The processor implemented method of claim 4, wherein the one or more statistics of the distribution of the sequence of generated displacements comprise at least one of a mean, a variance, and a skewness, wherein a Maximum Mean Discrepancy (MMD) loss is computed using the one or more statistics, and wherein the MMD loss is a measure of similarity or a dissimilarity between a distribution of (i) the plurality of eye blink movements and (ii) one or more ground truth eye blink movements.

6. A system, comprising:
a memory storing instructions;
one or more communication interfaces; and
one or more hardware processors coupled to the memory via the one or more communication interfaces, wherein the one or more hardware processors are configured by the instructions to:

obtain an audio speech and an identity image of a target individual;

extract, via the one or more hardware processors, one or more DeepSpeech features of the target individual from the audio speech;

generate, using the extracted one or more DeepSpeech features, via a trained speech-to-landmark generation network executed by the one or more hardware processors, a speech-induced motion on a sparse representation of a neutral mean face pertaining to the at least one user, wherein the sparse representation of the speech-induced motion comprises a plurality of facial landmark points;

generate, via a video dataset, a plurality of eye blink movements from random noise input, wherein the plurality of eye blink movements are generated for each eye based on a sequence of generated displacements of associated facial landmark points of each eye region, and wherein the plurality of eye blink movements comprise a set of eye landmark points with blink motion;

replace one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion;

generate one or more target-specific landmark points based on (i) the set of final landmark points and (ii) an identity landmark obtained from the identity image; and generate, an attention-based texture, using an attention map and a color map that are learnt using the one or more target-specific landmark points and the identity image, wherein the attention-based texture serves as an animated talking face of the target individual.

7. The system as claimed in claim 6, wherein the identity image comprises an image containing a neutral facial expression of the target individual.

8. The system as claimed in claim 6, wherein the plurality of eye blink movements are generated from random noise input by:

performing a comparison of the sequence of generated displacements of the associated facial landmark points of each eye region with one or more ground truth displacements, wherein one or more higher order moments of distribution of the sequence of generated displacements are compared with the one or more ground truth displacements; and generating the plurality of eye blink movements based on the comparison.

9. The system as claimed in claim 8, wherein the one or more higher order moments of the sequence of generated displacements comprise one or more statistics of the distribution of the sequence of generated displacements.

10. The system as claimed in claim 9, wherein the one or more statistics of the distribution of the sequence of generated displacements comprise at least one of a mean, a variance, and a skewness, wherein a Maximum Mean Discrepancy (MMD) loss is computed using the one or more statistics, and wherein the MMD loss is a measure of a similarity or a dissimilarity between a distribution of (i) the plurality of eye blink movements and (ii) one or more ground truth eye blink movements.

11. A computer program product comprising a non-transitory computer readable medium having a computer readable program embodied therein, wherein the computer readable program, when executed on a computing device, causes the computing device to generate identity preserving realistic talking face using audio speech of a user by:
  obtaining an audio speech and an identity image of a target individual;
  extracting, via the one or more hardware processors, one or more DeepSpeech features of the target individual from the audio speech;
  generating, using the extracted one or more DeepSpeech features, via a trained speech-to-landmark generation network, a speech-induced motion on a sparse representation of a neutral mean face pertaining to the at least one user, wherein the sparse representation of the speech-induced motion comprises a plurality of facial landmark points;
  generating, via a video dataset, a plurality of eye blink movements from random noise input, wherein the plurality of eye blink movements are generated for each eye based on a sequence of generated displacements of associated facial landmark points of each eye region, and wherein the plurality of eye blink movements comprise a set of eye landmark points with blink motion;
  replacing one or more eye landmark points of the plurality of facial landmark points with the set of eye landmark points with blink motion to obtain a set of final landmark points, the set of final landmark points comprises (i) the set of eye landmark points with blink motion and (ii) one or more landmark points containing the speech-induced motion;
  generating one or more target-specific landmark points based on (i) the set of final landmark points and (ii) an identity landmark obtained from the identity image; and
  generating, an attention-based texture, using an attention map and a color map that are learnt using the one or more target-specific landmark points and the identity image, wherein the attention-based texture serves as an animated talking face of the target individual.

12. The computer program product as claimed in claim 11, wherein the identity image comprises an image containing a neutral facial expression of the target individual.

13. The computer program product as claimed in claim 11, wherein the step of generating, via a video dataset, a plurality of eye blink movements from random noise input, comprises: performing a comparison of the sequence of generated displacements of the associated facial landmark points of each eye region with one or more ground truth displacements, wherein one or more higher order moments of distribution of the sequence of generated displacements of the associated facial landmark points of each eye region are compared with the one or more ground truth displacements; and generating the plurality of eye blink movements based on the comparison.

14. The computer program product as claimed in claim 13, wherein the one or more higher order moments of the sequence of generated displacements of the associated facial landmark points of each eye region comprise one or more statistics of the distribution of the sequence of generated displacements.

15. The computer program product as claimed in claim 14, wherein the one or more statistics of the distribution of the sequence of generated displacements comprise at least one of a mean, a variance, and a skewness, wherein a Maximum Mean Discrepancy (MMD) loss is computed using the one or more statistics, and wherein the MMD loss is a measure of a similarity or a dissimilarity between a distribution of (i) the plurality of eye blink movements and (ii) one or more ground truth eye blink movements.

\* \* \* \* \*